United States Patent [19]

Qureshi

[11] 4,344,176
[45] Aug. 10, 1982

[54] TIME RECOVERY CIRCUITRY IN A MODEM RECEIVER

[75] Inventor: Shahid U. H. Qureshi, Natick, Mass.

[73] Assignee: Codex Corporation, Mansfield, Mass.

[21] Appl. No.: 136,921

[22] Filed: Apr. 3, 1980

[51] Int. Cl.³ ............................................. H04B 3/04
[52] U.S. Cl. .................................. 375/15; 375/118; 333/18; 364/724
[58] Field of Search ............... 375/107, 110, 113, 118, 375/11–16, 77; 370/100; 364/726, 724; 333/18; 179/2 DP; 455/46, 202

[56] References Cited

U.S. PATENT DOCUMENTS

| | | | |
|---|---|---|---|
| 3,914,691 | 10/1975 | Meadors | 333/18 |
| 3,978,407 | 8/1976 | Forney | 333/18 |
| 4,004,226 | 1/1977 | Qureshi | 333/18 |
| 4,089,061 | 5/1978 | Milewski | 333/18 |
| 4,227,252 | 10/1980 | Godard | 375/118 |
| 4,237,554 | 12/1980 | Gitlin | 333/18 |

OTHER PUBLICATIONS

D. L. Lyon "Envelope-Derived Timing Recovery in QAM and SQAM Systems", IEEE Transactions on Communications, Nov. 1975, pp. 1327–1331.
K. Watanabe, K. Inoue and Y. Sato, "A 4800 Bit/s Microprocessor Data Modem", IEEE Transactions on Communication, vol. Com-26, No. 5, May 1978, pp. 493–498.

Primary Examiner—Benedict V. Safourek
Assistant Examiner—Stephen Chin

[57] ABSTRACT

Modem receiver apparatus having circuitry for receiving, demodulating, and decoding, at a first rate of 1/T bauds per second, a modulated double sideband carrier signal encoded to represent digital bits, wherein the received signal is converted to a stream of digital samples, the samples occurring at a sample rate higher than 1/T per second, and having timing recovery circuitry comprising phase-splitting filter circuitry connected to split the modulated double-sideband carrier signal sample stream into a pair of modulated carrier signal sample streams, the carrier frequencies associated with the pair of streams being equal but 90° apart in phase, first circuitry connected to the output of the filter circuitry for generating a timing signal, and second circuitry connected in parallel with the first circuitry to the output of the filter circuitry for demodulating the output of said filter circuitry, the first circuitry comprising first circuitry for additionally filtering the output of said filter circuitry and providing, at a second rate at least as high as 2/T per second, successive values representative of the absolute value of the additionally filtered output, and second circuitry for generating the timing signal from the successive values provided by said first circuitry.

9 Claims, 6 Drawing Figures

TIME RECOVERY CIRCUITRY IN A MODEM RECEIVER

BACKGROUND OF THE INVENTION

This invention relates to modem receiver apparatus in which a modulated carrier signal represents digital bits.

Timing recovery and timing initialization are important aspects of modems.

D. L. Lyon "Envelope-Derived Timing Recovery in QAM and SQAM Systems", *IEEE Transactions on Communications*, November 1975, pp. 1327-1331 discloses choosing timing phase, in an equalized modem, such that the spectral component at the Nyquist band edge is maximized. This is accomplished by passing an unsampled low-pass demodulated data waveform, first through a narrow-band filter turned to half the baud rate, then to a squaring device, and finally to a narrow-band filtej tuned to the baud rate. 7

Forney, Jr. et al., U.S. Pat. No. 3,978,407 teaches obtaining timing recovery and timing initialization by obtaining an approximation of the absolute value of the difference between two low-pass filtered complex data streams, separated in time by a signaling interval T.

Qureshi et al., U.S. Pat. No. 4,004,226 shows a timing recovery scheme wherein the sampling epoch is altered based upon the difference between the equalizer tap coefficient of greatest magnitude and a desired value for that tap coefficient.

K. Watanabe, K. Inoue and Y. Sato, "A 4800 Bit/s Microprocessor Data Modem", *IEEE Transactions on Communications*, Vol. COM-26, No. 5, May 1978, pp. 493-498 describes a microprocessor implemented data modem, wherein the sampling timing is dependent upon one of the coefficients of an automatic adaptive equalizer.

SUMMARY OF THE INVENTION

The invention is applicable to modem receiver apparatus having means for receiving, demodulating, and decoding, at a first rate of 1/T bauds per second, a modulated double sideband carrier signal encoded to represent digital bits, wherein the received signal is converted to a stream of digital samples, said samples occurring at a sample rate higher than 1/T per second.

In one aspect, the invention provides improved timing recovery circuitry featuring phase-splitting filter circuitry connected to split a modulated carrier signal sample stream into a pair of modulated carrier signal sample streams, the carrier frequencies associated with the pair of streams being equal but 90° apart in phase, first means connected to the output of the filter circuitry for generating a timing signal, and second means connected in parallel with the first means for demodulating the output, the first means having first circuitry for additionally filtering the output and providing at a second rate at least as high as 2/T per second successive values representative of the absolute value of the additionally filtered output, and second circuitry for generating the timing signal from the successive values.

In preferred embodiments, the first circuitry includes a filter having an amplitude characteristic of $|\sin[\pi(f-f_c)T/2]|$ where $f_c$ is the carrier frequency; the filter has a flat group delay characteristic of T/4 seconds; the timing signal is an error value representative of estimated timing error and the second circuitry includes third circuitry for accumulating successive error values and generating a timing correction signal when the accumulated error values exceed a threshold; the accumulation of error values is started from 0 when the accumulated error values exceed the threshold; a digital sampler, a frequency oscillator, and frequency division circuitry, wherein the timing signal is a correction signal which controls the timing of an output of the division circuitry, are also provided; and the second circuitry includes third circuitry for sampling the successive values at times T+T/4 and T−T/4 to produce first and second timing samples, fourth and fifth circuitries for generating timing error values representative of the squared absolute values of the first and second timing samples, and averaging filter circuitry for averaging the timing error values over time.

In another aspect the invention provides improved timing initialization circuitry featuring means for generating quadrature component pairs for digital samples at a sample rate, means for generating a sequence of values representative of the absolute values of the quadrature components of the digital samples respectively, means for selecting the largest value over a one-baud time interval, and means for thereafter generating the quadrature component pairs at a rate less than the sample rate for each baud, and selecting for decoding one of the component pairs spaced in time from that corresponding to the largest value by an integer multiple of T where T is the symbol interval.

In preferred embodiments, the means for generating the values includes filter circuitry for spectrally limiting the component pairs and means for computing the values from the output of the filter circuitry; and the means for selecting includes means for producing an index corresponding to the position of the largest value in the one-baud time interval and the means for generating the quadrature component pairs includes non-recursive digital filter circuitry having delay line means for storing filter input samples, coefficient means for respectively modifying the stored input samples with coefficients, means to control the alignment of the delay line means and the coefficient means in accordance with the index, and output means for producing the quadrature component pairs on the basis of the modified input samples.

Other advantages and features will appear from the following description of the preferred embodiment, and in the claims.

DESCRIPTION OF THE PREFERRED EMBODIMENT

We first briefly describe the drawings.

Drawings

Structure

Figure 1:
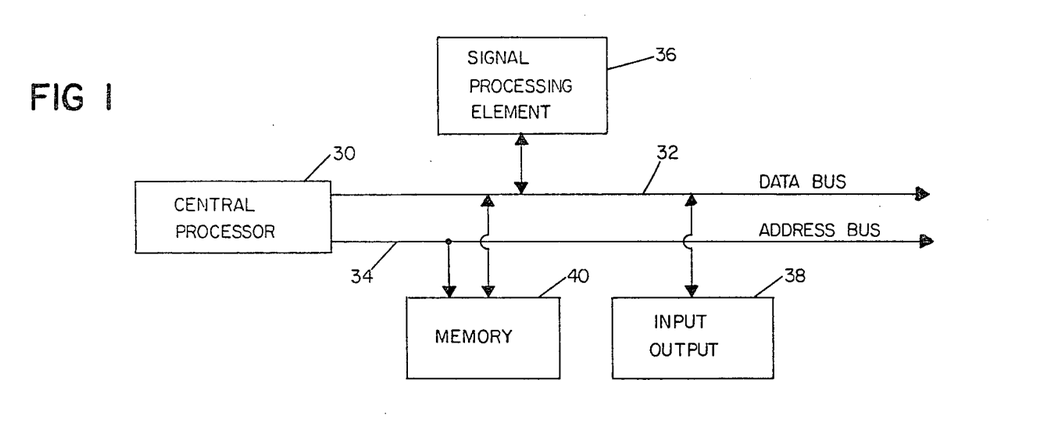
FIG. 1 is a general block diagram of a receiver embodying the invention.

Referring to FIG. 1, the receiver has a central microprocessor (MPU) 30 (the Motorola 68B00 general purpose microprocessor chip), connected to data bus 32 and address bus 34. Signal processor element (SPE) 36 and input/output circuitry 38 are also connected to bus 32. MPU memory 40 is connected to both buses.

Figure 2:
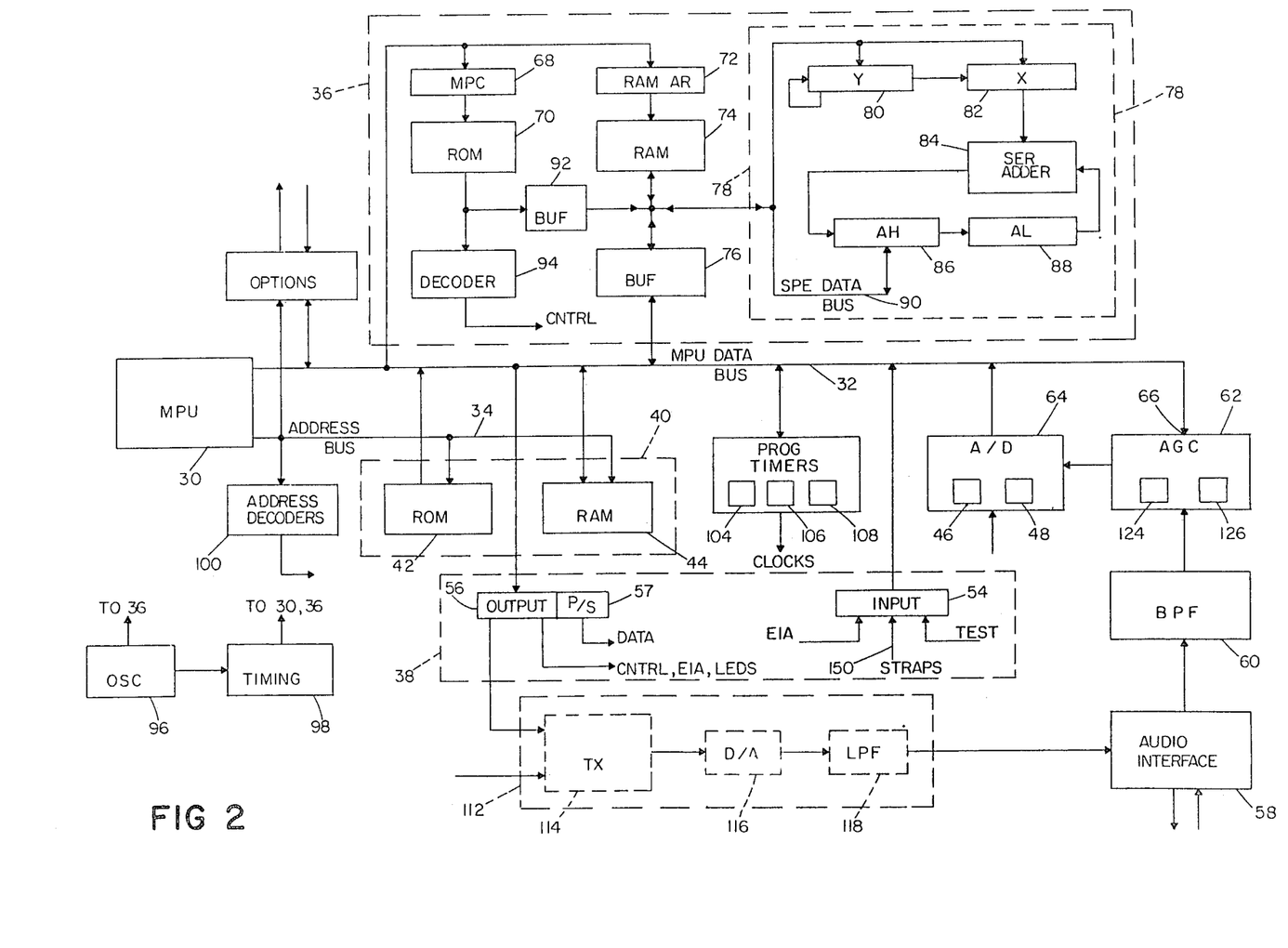
FIG. 2 is a more detailed block diagram of the receiver.

Referring now to FIG. 2, MPU 30 has a 4K×8 bit ROM program memory 42, from which MPU 30 executes instructions, and a 256×8 bit RAM data memory 44. MPU 30 interfaces with conventional data terminal equipment and the modem front panel (straps, test switches, indicators, and the like), through input and output registers 54 and 56.

Audio interface 58, band pass filter 60, AGC element 62, and A/D converter 64 are arranged to initially process received signals and put them on data bus 32. Bus 32 also has a control connection 66 directly to element 62.

Converter 64 has a sample-and-hold circuit 46 clocked at 7200 samples/sec., and an 8 bit A/D element 48.

AGC element 62 consists of an 8 bit latch 124 connected to multiplying D/A converter 126. Latch 124 is arranged to receive a coarse gain control signal g from MPU 30, once during each symbol interval and to pass g to multiplying D/A converter 126, thus producing an output voltage $v_{out}$ proportional to the product of g and input voltage $v_{in}$.

SPE 36 is an independent, programmable digital processor which is loosely coupled to, and executes tasks under the control of, MPU 30. These elements of SPE 36 are connected to data bus 32: microprogram counter (MPC) 68, which can be loaded by MPU 30 and determines the next instruction address in 1K×8 bit ROM program memory 70 for SPE 36; random access memory address register (RAM AR) 72, which can also be loaded by MPU 30 and points to the operand in 256×8 bit data memory 74; and 8 bit read/write buffer 76, through which MPU 30 and SPE 36 can exchange data.

Arithmetic unit 78, in SPE 36, has two 8 bit registers, Y register 80 and X register 82; a serial adder 84 which can receive, in sequence, the data stored in X register 82; and two bit 8 accumulators, "high" accumulator AH 86 which stores the 8 most significant bits of a 16 bit number and "low" accumulator AL 88 which stores the remaining 8 bits. Y register 80, X register 82, and AH 86 are all connected through SPE data bus 90 to SPE data memory 74, read/write buffer 76, and intermediate buffer 92. Intermediate buffer 92 is in turn connected to SPE program memory 70.

SPE 36 also has an instruction register decoder 94 connected to SPE program memory 70.

Crystal oscillator 96 generates a 7.3728 MHz clock signal which is provided to SPE 36 and to frequency division circuitry 98. The output of frequency division circuitry 98 is a 1.8432 MHz clock signal which is provided to MPU 30.

Address decoders 100 connect with all components connected to MPU data bus 32.

Three programmable timers 104, 106, and 108 are provided. Timer 104 is frequency controlled by MPU 30 and generates an adjusted clock from which a sample clock signal for A/D converter 64 as well as a receive bit-rate clock signal for the terminal are derived. Timer 106, also frequency controlled by MPU 30, generates and supplies to MPU 30 a software timing clock. Timer 108 is in communication only with MPU 30, can be reset to a predetermined time interval by MPU 30, and serves a "watchdog" function described below.

Shown in phantom in FIG. 2 are elements that participate in the modem transmitter: LSI transmitter chip (e.g., Motorola Part Number 6862) 114, D/A converter 116, and low pass filter 118, connected between output register 56 and audio interface 58.

Figure 3:
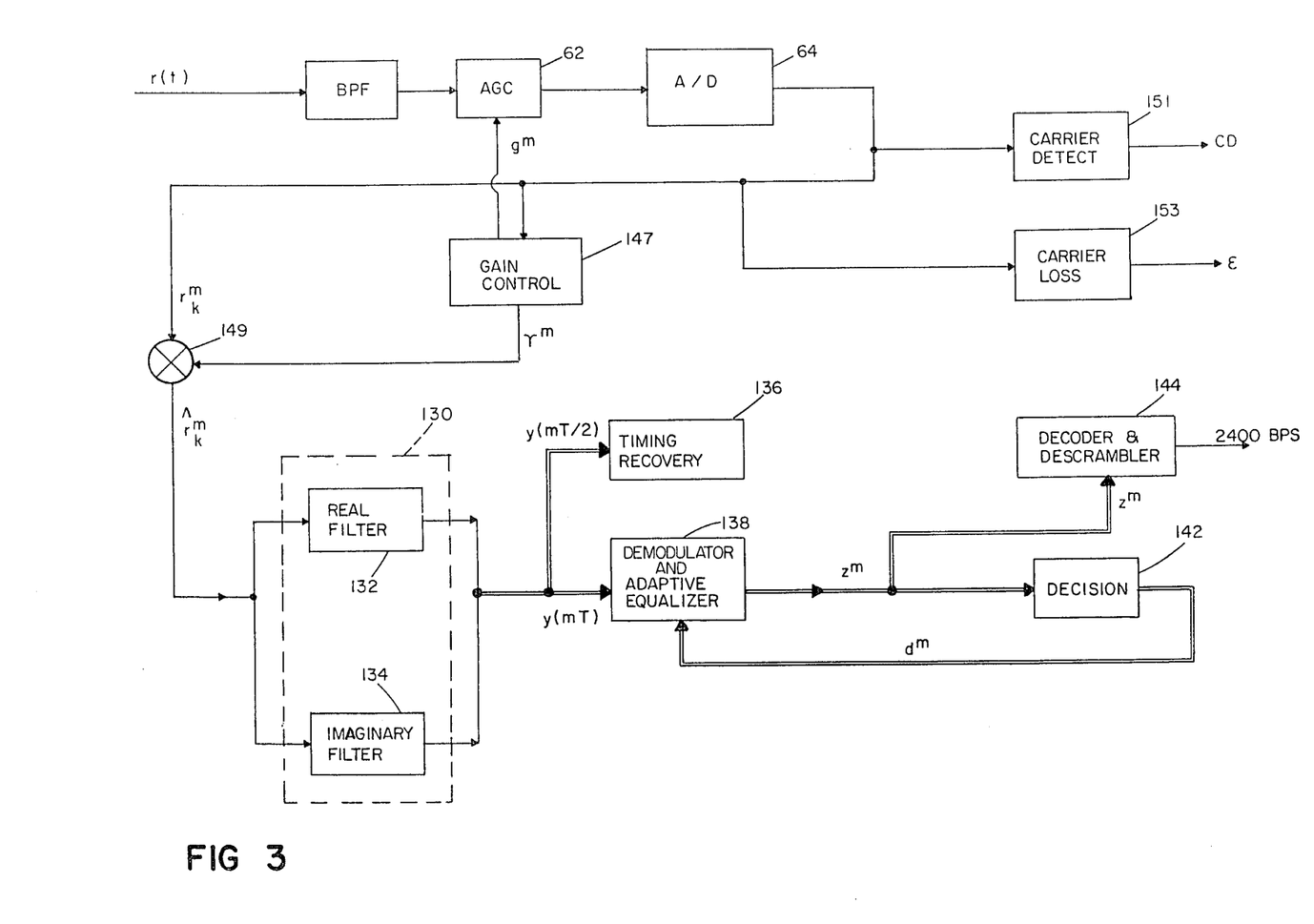
FIG. 3 is a block diagram illustrating procedures carried out by microprocessor circuitry in the receiver.

MPU 30 and SPE 36 are programmed to effect the further modem "circuits" shown generally in FIG. 3. In particular, there is effected a non-recursive, digital, phase splitting "filter" 130, with real and imaginary parts 132 and 134, which receives the output of A/D converter 64, after scaling via "multiplier" 149, and provides filtered outputs to timing recovery "circuit" 136 (at 2400 samples/sec., twice the baud rate) and to demodulation and adaptive equalization circuitry 138 (at 1200 samples/sec., the baud rate). The demodulated and equalized signal $z^m$ is passed to decision "circuit" 142, which in turn feeds "decoder/descrambler" 144 to provide a 2400 bps digital output. The output $d^m$ of decision circuit 142 is provided to circuit 138 for use in adjusting the demodulator carrier phase and frequency and updating the adaptive equalizer coefficients.

Gain control "circuit" 147, depending on the strength of signals received from converter 64, provides coarse gain control factor g to AGC element 62 and fine gain control factor $\gamma$ to multiplier 149, located within SPE 36. Carrier detect "circuit" 151 and carrier loss "circuit" 153 monitor the strength of signals from converter 64 to determine if a data transmission has begun or terminated.

Further details of how MPU 30 and SPE 36 effect those modem "circuits" and their functions appear in my copending U.S. patent application Ser. No. 136,920 entitled "Modem Circuitry", filed on the same day as this application and hereby incorporated by reference.

Operation

In general, the modem, while on line, monitors the average strength of the signal samples produced by A/D converter 64 at a rate of 7,200 times per second. When a preselected threshold strength is exceeded, MPU 30 raises a carrier detect condition and sets an initial gain factor g for AGC 62. With carrier detected and gain initialized, the receiver enters a timing jam mode in which one out of six consecutive samples produced by A/D converter 64 is selected by MPU 30 for equalization and demodulation. Thereafter the tap coefficients of the equalizer are set to initial values.

The above steps completed, the receiver enters a data mode, wherein the AGC, timing rate, carrier phase, and equalizer tap coefficients are continually updated. The average signal strength is also continually computed; when it falls below a preselected carrier-off threshold; a carrier loss signal is raised, taking the modem out of data mode.

Further details of overall operation appear in the above-identified copending application. Aspects of the operation relating to the invention claimed herein are as follows.

Figure 4:
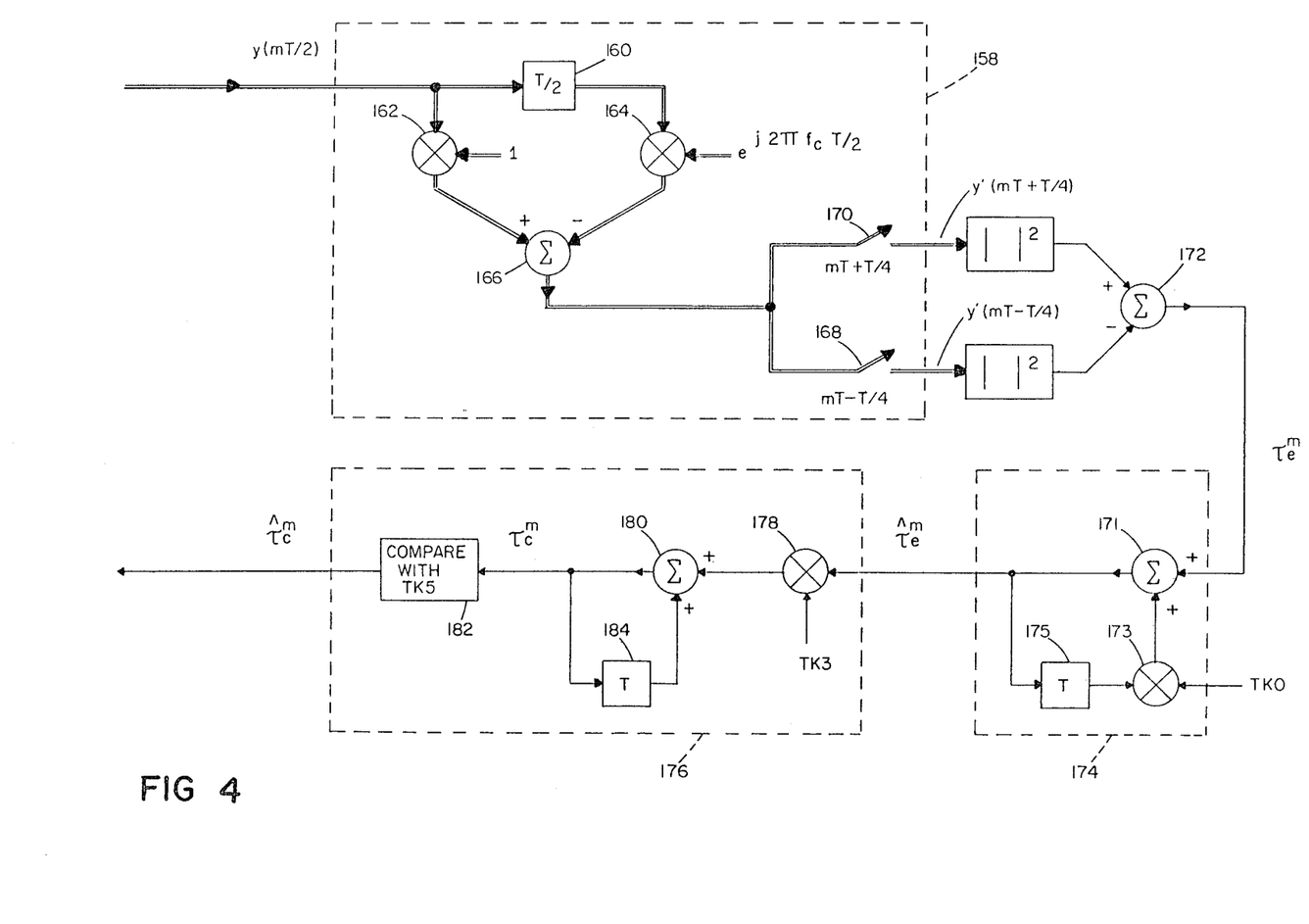
FIG. 4 is a block diagram of a timing recovery procedure carried out by microprocessor circuitry in the receiver.

The input to timing recovery circuit 136 of FIG. 3, shown in more detailed block diagram format in FIG. 4, is, alternately, the main sample output y(m/T) of filter 130 and the timing sample output y(mT−T/2) of filter 130. Its input sample rate is thus 2400 samples per sec.

Samples y(mT/2) are passed through prefilter 158, made up of T/2 delay 160, multiplication elements 162 and 164, and summation element 166.

Prefilter 158 has a flat group delay of T/4 seconds and an amplitude characteristic of $|\sin[\pi(f-f_c)T/2]|$. Its output is denoted as y'(mT±T/4). The delay introduced by prefilter 158 is depicted figuratively in FIG. 4 as samplers 168 and 170, having sampling times of (mT±T/4).

The frequency response of prefilter 158 has zero response at the carrier frequency $f_c$, which carries no timing information. The prefilter gain increases with $|f-f_c|$, enhancing signals which carry more timing information, such as $f_c \pm 1/8T$ and $f_c \pm 7/8T$. As a result, low level timing information, resulting from repeated "00" and "10" dibits in the coding specified by C.C.I.T.T. V.26B (or Bell 201) mode, is not rejected.

Timing error $\tau_e{}^m$, the output of summation element 172, is equal to the difference of the squares of the complex magnitudes of y'(mT+T/4) and y'(mT−T/4). Samples y'(mT+T/4) and y'(mT−T/4) are early and late samples of a DC component and a sinusoidal component of frequency R (i.e., they "straddle" a peak of the resultant sinusoidal waveform), where R is the symbol rate.

Timing error $\tau_e{}^m$ is passed through first-order, digital recursive filter 174 to remove noise and provide some averaging over time. Filter 174 is made up of adder 171, multiplier 173, and T delay 1755. Its output is:

$$\hat{\tau}_e{}^m = TKO \hat{\tau}_e{}^{m-1} + \tau_e{}^m$$

where TKO is a constant of 3/4, which yields a time constant of about 4 symbols.

Rather than adjust the sampling instant whenever $\hat{\tau}_e{}^m$ is nonzero, it is preferable to accumulate the filtered timing error and adjust only when the accumulated error exceeds a preselected threshold. By doing so, small jitter variations around the point of zero timing error are ignored. To this end is provided accumulator circuit 176, consisting of multiplier 178, summation element 180, multiplier 182, and T delay 184. The process carried out by accumulator circuit 304 can be represented by:

$$\tau_c{}^m = \tau_c{}^{m-1} + TK3 \hat{\tau}_e{}^m$$

where TK3 is a scaling constant.

$\tau_c{}^m$, the accumulated timing error, is compared, once each symbol period, to a threshold, TK5. $\hat{\tau}_c{}^m$, a signal sent to MPU 30 once each symbol period, has a value of 1 if $\tau_c{}^m \geq TK5$, −1 if $\tau_c{}^m \leq -TK5$, and 0 otherwise.

The value of $\hat{\tau}_c{}^m$ becomes the basis upon which MPU 30 decides whether or not to alter timer 104. In particular, whenever $\hat{\tau}_c{}^m$ is nonzero, MPU 30 alters timer 104, such that sampling time of sample and hold circuit 46 is changed by T/768, depending on the sign of $\hat{\tau}_c{}^m$. Whenever $\hat{\tau}_c{}^m$ is nonzero, SPE 36 also resets $\tau_c{}^m$ to zero.

The method by which the receiver acquires initial timing is generally as follows.

In the C.C.I.T.T. V.26A mode, a 180-degree phase reversal is transmitted, each symbol period, generating two tones at $f_c \pm 1/2T$ for a short period of time prior to the transmittal of any data message. In the C.C.I.T.T. V.26B or Bell 201 mode, phase changes of 225 degrees are transmitted, generating tones at $f_c - 3/8T$ Hz and $f_c + 5/8T$ Hz during this same period. During timing jam, the receiver passes digital samples $\{\hat{r}\}$ of these receives "sync-up" signals at a rate of 7,200 samples/sec., through filter 130, whose real and imaginary outputs are squared and added together, 7,200 times per sec. The digitized waveform resulting from this squaring and adding process has a DC component and a sinusoidal component with a frequency of the sumbol rate of 1,200 Hz.

The sinusoidal component at 1,200 Hz may be used to derive the synchronous timing required, but it is still necessary to choose the phase of the sampling wave (i.e., that point on the 1,200 Hz sinusoidal waveform which corresponds to a sampling instant). Choice of an improper sampling phase could produce a null in the spectral component at the Nyquist bandedge of the baseband sampled spectrum. Choosing the peaks of the 1,200 Hz, synchronizing waveform maximizes the energy at the edge of the Nyquist baseband spectrum and, thus, minimizes the possibility of a spectral null at that point.

In the present receiver, six samples are taken, spanning a time period of 1/1200 sec., and passed through filter 130. The resultant real and imaginary outputs are squared and summed for each sample and then compared to determine which is the maximum, and thus corresponds most closely to the peak of the 1,200 Hz sinusoidal waveform. The initial main sample y(mT) to be demodulated is then chosen to be a multiple of six samples (i.e., at a sample rate of 7,200 samples/sec.) later than the maximum sum of squares producing sample. Timing is thus initialized without adjustment to timer 104.

The energy in the symbol-rate sampled baseband spectrum is maximized at 1/2T Hz and 3/8T for the "sync-up" transmissions of the C.C.I.T.T. V.26A and V.26B (Bell 201) modes, respectively.

More specifically, the receiver implements timing jam as follows.

As soon as the timing jam mode is entered, MPU 30 sends each sample $r_k$ to SPE 36, which, after multiplying $r_k$ by five gain factor $\gamma$ to produce $\hat{r}_k$, enters the sample $\hat{r}_k$ into the first unit of 21 unit delay line 284 (shown in FIGS. 5 and 6), located in memory 74, computes the real and imaginary outputs of filter 130 by beginning computation at the first unit of delay line 284 and proceeding through delay line 284, up to and including the 18th unit, squares the resultant outputs, sums them and enters the sum of their squares on buffer 76.

Figure 5:
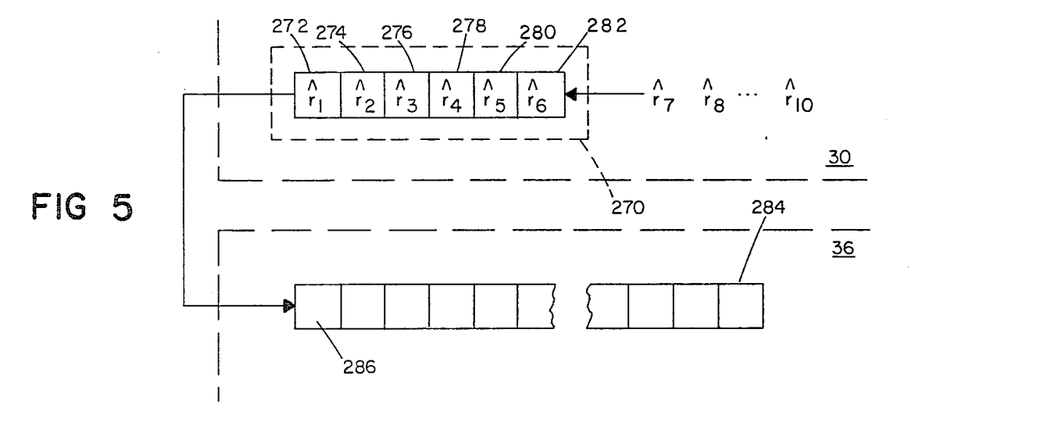
FIGS. 5 and 6 are block diagrams illustrating the method by which microprocessor circuitry in the receiver initializes timing.
Figure 6:
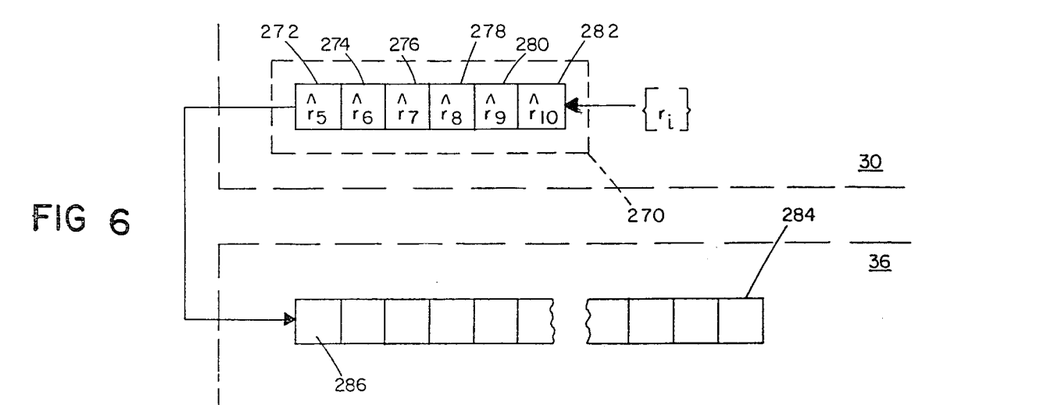

MPU 30 throws away the contents of buffer 76 for the first 18 T/6 sample periods of timing jam mode, since it takes 18 sample periods before the first 18 units of delay line 284 all contain samples $\{\hat{r}\}$ (i.e., for the transient to pass). Beginning with the 18th sample period of timing jam mode, MPU 30 buffers each incoming sample $\hat{r}_k$ in six-sample buffer unit 270, as well as sending it to SPE 36, where it is entered into a first delay unit 286 of filter 130. Filter 130 is then "cycled" through the first 18 delay units, and the sum of the squares of its outputs are sent to MPU 30 via buffer 76. MPU 30 now reads the contents of buffer 76 and stores it in memory 44.

The next five $\{\hat{r}\}$ samples are processed in the same manner by MPU 30 and SPE 36, the second sample arriving after the transient has passed being entered in the second unit of six-sample buffer 270, and so on.

When six-sample buffer 270 is full, MPU 30 runs a routine to determine which of the samples $\{\hat{r}\}$ produced the maximum summed, squared filter 130 outputs. The sample $\{\hat{r}\}$ contained in six-sample buffer 270 are then shifted, such that any samples received after the maximum producing sample $\{\hat{r}\}$ occupy the earliest time slots of buffer 270. Enough additional samples $\{\hat{r}\}$ are then collected to fill buffer 270, and timing jam terminates.

By way of example, FIGS. 5 and 6 show the shifting process that MPU 30 would implement had the sample $\hat{r}_4$ (i.e., the sample occupying fourth buffer unit 278) produced the maximum summed and squared filter 130 output. FIG. 5 shows the contents of buffer 270 prior to the shifting operation, while FIG. 6 shows the contents of buffer 270 just after completion of timing jam.

In FIG. 5, samples $\hat{r}_5$ and $\hat{r}_6$ have been shifted to the two buffer units 272 and 274 representing the two earliest time slots of the six-sample baud. Additional samples $\hat{r}_7$, $\hat{r}_8$, $\hat{r}_9$, and $\hat{r}_{10}$ have been entered into buffer units 276, 278, 280, and 282, respectively.

Sample $\hat{r}_{10}$, being 6 sample periods more recent than $\hat{r}_4$, is another maximum square producing sample. After the sequential transfer of samples $\hat{r}_4$ to $\hat{r}_{10}$ to 21 unit delay line 284, located within SPE 36, $\hat{r}_{10}$ will occupy first delay unit 286. As SPE 36 receives each of the samples $\hat{r}_5$ to $\hat{r}_{10}$, it writes each sample into the appropriate unit of delay line 286. Thus, $\hat{r}_5$ and $\hat{r}_6$ are "rewritten" into delay line 284 while $\hat{r}_7$ to $\hat{r}_{10}$ are entered as new samples.

It has been discovered that additional timing jam accuracy is achieved by digitally filtering the output of filter 130 before squaring and summing to determine the maximum sum of squares. In the present modem a complex digital filter $(1-D^4)$ (not shown), having a frequency response of $2j \exp(-j\tau f/1800) \sin(\pi f/1800)$, processes the output of filter 130 during timing jam only. The output of this timing jam filter is then squared and summed, as above described, for each sample $\hat{r}$ taken during timing jam.

The timing jam filter has a flat group delay characteristic of two sample intervals which is taken into account, once the main sample has been selected, by correct placement of the samples in delay line 284 to maintain the time ordered sequence.

The amplitude response of the timing jam filter has nulls at 0, 1800, and 3600 Hz and peaks at 900 and 2700 Hz. The 2700 Hz spectral component sent during the 1200 b/s V.26A sync-up is boosted 6dB with respect to the 1500 Hz spectral component. Similarly, the 2550 Hz component sent during the V.26B (Bell 201) sync-up is boosted with respect to the stronger 1350 Hz spectral component.

Other embodiments are within the following claims.

I claim:

1. Modem receiver apparatus having means for receiving, demodulating, and decoding, at a first rate of 1/T bauds per second, a modulated double sideband carrier signal encoded to represent digital bits, wherein the received signal is converted to a stream of digital samples, said samples occurring at a sample rate higher than 1/T per second, and having timing recovery circuitry comprising phase-splitting filter circuitry connected to split said modulated double-sideband carrier signal sample stream into a pair of modulated carrier signal sample streams, the carrier frequencies associated with said pair of streams being equal but 90° apart in phase, first means connected to the output of said filter circuitry for generating a timing signal, and second means connected in parallel with said first means to the output of said filter circuitry for demodulating said output of said filter circuitry, said first means comprising first circuitry for additionally filtering said output of said filter circuitry and providing, at a second rate at least as high as 2/T per second, successive values representative of the absolute value of said additionally filtered output, and second circuitry for generating said timing signal from said successive values provided by said first circuitry.

2. The apparatus of claim 1 wherein said first circuitry comprises a filter having a frequency response characteristic of $|\sin[\pi(f-f_c) T/2]|$, where $f_c$ is said carrier frequency.

3. The apparatus of claim 2 wherein said filter has a flat group delay characteristic of T/4 seconds.

4. The apparatus of claim 1 wherein said timing signal is an error value representative of estimated timing error, and said second circuitry comprises third circuitry for accumulating successive error values and generating a timing correction signal when said accumulated error values exceed a threshold.

5. The improvement of claim 1 wherein said second circuitry comprises third circuitry for sampling said successive values at times T+T/4 and T−T/4 to produce first and second timing samples, fourth and fifth circuitries for generating timing error values representative of the squared absolute values of said first and second timing samples, and averaging filter circuitry for averaging said timing error values over time.

6. The apparatus of claim 4 wherein said accumulation of error values is started from zero when said accumulated error values exceed said threshold.

7. Modem receiver apparatus for receiving, demodulating, and decoding, at a first rate of 1/T bauds per second, a modulated double sideband carrier signal encoded to represent digital bits, wherein the received signal is converted to a stream of digital samples, said samples occurring at a sample rate higher than 1/T per second, and having timing jam circuitry comprising, means for generating quadrature component pairs of said digital samples, at said sample rate, means for generating a sequence of values representative of the absolute values of the quadrature components of said digital samples, respectively, means for selecting the largest said value over at least a one-baud time interval, and means for thereafter generating said quadrature component pairs at a rate less then said sample rate, for each baud, and for selecting for decoding one of said component pairs spaced in time from that corresponding to said largest value by an integer multiple of T.

8. The improvement of claim 7 wherein said means for generating said values comprises:

filter circuitry for spectrally limiting said component pairs, and means for computing said values from the output of said filter circuitry.

9. The apparatus of claim 7 wherein said means for selecting includes means for producing an index corresponding to the position of said largest value in said one-baud time interval, and said means for generating said quadrature component pairs comprises non-recursive, digital filter circuitry comprising
   delay line means for storing filter input samples, coefficient means for respectively modifying said stored input samples with coefficients, means to control the alignment of said delay line means and said coefficient means in accordance with said index, and output means for producing said quadrature component pairs on the basis of said modified input samples.

* * * * *

UNITED STATES PATENT OFFICE
CERTIFICATE OF CORRECTION

Patent No. 4,344,176          Dated August 10, 1982

Inventor(s) Shahid U. H. Qureshi

It is certified that error appears in the above-identified patent and that said Letters Patent are hereby corrected as shown below:

Column 1, line 19, "filter" is misspelled;

Column 1, line 19, after "rate." delete "7";

Column 4, line 56, after "threshold", delete the semicolon and insert a comma instead;

Column 5, line 29, "1755" should be --175--;

Column 5, line 51, in the formula "$\geqq$" should be --$\geq$-- and "$\leqq$" should be --$\leq$--;

Column 5, line 68, "receives" should be --received--;

Column 6, line 5, "symbol" is misspelled;

Column 6, line 32, after "3/8T", insert --Hz--;

Column 7, line 1, "sample" should be --samples--.

Signed and Sealed this

Twenth-eighth Day of September 1982

[SEAL]

Attest:

GERALD J. MOSSINGHOFF

Attesting Officer          Commissioner of Patents and Trademarks